3,729,330
PHTHALOCYANINE ORGANIC PIGMENTS
Heinrich Leister and Karl-Heinz Wolf, Cologne, Germany, assignors to Farbenfabriken Bayer Aktiengesellschaft, Leverkusen, Germany
No Drawing. Filed Mar. 10, 1971, Ser. No. 123,035
Claims priority, application Germany, Mar. 17, 1970,
P 20 12 505.7
Int. Cl. C08h 17/14
U.S. Cl. 106—288 Q    8 Claims

ABSTRACT OF THE DISCLOSURE

Copper phthalocyanine and nickel phthalocyanine pigments containing 60–98 mol percent of a copper or nickel phthalocyanine, which may be substituted and 40–2 mol percent of one or more tetraazaporphines of the formula

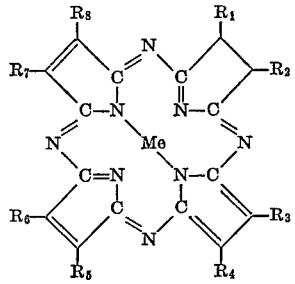

wherein

Me represents copper or nickel, $R_1$ represents an alkyl radical, a cycloalkyl radical, an aralkyl radical or an aryl radical and $R_2$, $R_3$, $R_4$, $R_5$, $R_6$, $R_7$ and $R_8$ independently of one another represent hydrogen, an alkyl radical, a cycloalkyl radical, an aralkyl radical or an aryl radical, and wherein one or more of the pairs $R_3$ and $R_4$, $R_5$ and $R_6$ or $R_7$ and $R_8$ are cyclised to give cycloaliphatic units or aliphatic units which may be substituted by chlorine, bromine, lower alkyl, cycloalkyl, aralkyl, phenyl, alkoxy or sulphonic acid groups, or units containing hetero-atoms and process for their production.

These pigments are resistant to crystallisation in organic solvents.

---

The subject of the present invention is copper phthalocyanine and nickel phthalocyanine pigments containing 60–98 mol percent of a copper or nickel phthalocyanine, which may be substituted by chlorine, bromine, lower alkyl, cycloalkyl, aralkyl, phenyl, alkoxy or sulphonic acid groups, and 40–2 mol percent of one or more tetraazaporphines of the formula

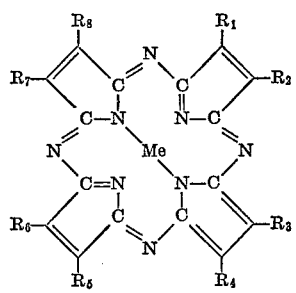

(I)

wherein

Me represents copper or nickel, $R_1$ represents an alkyl radical, a cycloalkyl radical, an aralkyl radical or an aryl radical and $R_2$, $R_3$, $R_4$, $R_5$, $R_6$, $R_7$ and $R_8$ independently of one another represent hydrogen, an alkyl radical, a cycloalkyl radical, an aralkyl radical or an aryl radical, and wherein one or more of the pairs $R_3$ and $R_4$, $R_5$ and $R_6$ or $R_7$ and $R_8$ are cyclised to give cycloaliphatic units or aliphatic units which may be substituted by chlorine, bromine, lower alkyl, cycloalkyl, aralkyl, phenyl, alkoxy or sulphonic acid groups, or units containing hetero-atoms.

Another subject of the invention are processes for the manufacture of the aforedescribed phthalocyanine pigments and the phthalocyanine dyestuffs thus obtained.

A still further subject of the invention is the use of the aforesaid phthalocyanines as pigments.

Finally, a further subject of the invention are pigment dispersions which are characterised by a content of these copper and nickel phthalocyanine pigments, and which may contain other metal-containing phthalocyanines and/or phthalocyanine derivatives, tensides, resin acid and/or its salts and/or resinous amines.

Possible alkyl radicals $R_1$, $R_2$, $R_3$, $R_4$, $R_5$, $R_6$, $R_7$ and $R_8$ are for example methyl, ethyl, n-propyl, iso-propyl and n-butyl. Suitable cycloalkyl radicals or aralkyl radicals $R_1$–$R_8$ are especially cyclohexyl, or benzyl and sulphobenzyl, preferably 4-sulphobenzyl. Suitable aryl radicals $R_1$–$R_8$ are in particular unsubstituted and/or substituted phenyl radicals. The phenyl radicals $R_1$–$R_8$ can be unsubstituted and/or substituted; possible substituted phenyl radicals are for example chlorophenyl, preferably 4-chlorphenyl, methylphenyl, preferably 4-tolyl and 4-isopropylphenyl, sulphophenyl, preferably 3- and 4-sulphophenyl, alkoxyphenyl, preferably 4-methoxyphenyl and 3,4-methylenedioxy-phenyl.

A particularly preferred group of copper and nickel phthalocyanine pigments according to the invention are those having a particle size of about $0.5\mu$ to about $10\mu$, preferably about $0.5\mu$ to about $3\mu$.

A preferred grou pof phthalocyanine pigments according to the invention are those which contain 75–96 mol percent of a copper phthalocyanine, which may be substituted by sulphonic acid groups, and 25–4 mol percent of one or more tetraazaporphines of the Formula I.

Especially preferred dyestuffs according to the invention are copper and nickel phthalocyanine pigments containing at an average 0.1–0.8 sulphonic acid groups per mol of phthalocyanine and consisting of 60–98 mol percent of a copper or nickel phthalocyanine, which may be substituted by chlorine, bromine, lower alkyl, cycloalkyl, aralkyl, phenyl, alkoxy or sulphonic acid groups, and 40–2 mol percent of one or more tetraazaporphines of the Formula I:

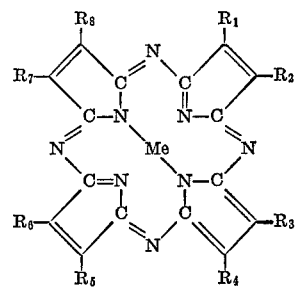

wherein

Me represents copper or nickel, $R_1$ represents an alkyl radical, a cycloalkyl radical, an aralkyl radical or an aryl radical, and $R_2$, $R_3$, $R_4$, $R_5$, $R_6$, $R_7$ and $R_8$ independently of one another represent hydrogen, an alkyl radical, a cycloalkyl radical, an aralkyl radical or an aryl radical, and wherein one or more of the pairs $R_3$ and $R_4$, $R_5$ and $R_6$ or $R_7$ and $R_8$ can be cyclised to give cycloaliphatic units or aromatic units which are optionally substituted by chlorine, bromine, lower alkyl, cycloalkyl, aralkyl, phenyl, alkoxy or sulphonic acid groups or units containing hetero-atoms.

An outstanding group of copper and nickel phthalocyanine pigments according to the invention are those containing at an average 0.1–0.6 sulphonic acid groups per mol of phthalocyanine and consisting of 75–96 mol percent of a copper or nickel phthalocyanine which is optionally substituted by chlorine, bromine, lower alkyl, aralkyl, phenyl, alkoxy or sulphonic acid groups, and 25–4 mol percent of one or more tetraazaporphines of the Formula I.

The process according to the invention is characterised in that (A) 85–99.5 mol percent, preferably 90–99 mol percent, of a benzene derivative which is optionally substituted by chlorine, bromine, lower alkyl, cycloalkyl, aralkyl, phenyl, alkoxy or sulphonic acid groups and which contains two optionally cyclised substituents in the ortho position, and which is capable of forming a tetraazaporphine ring, and 15–0.5 mol percent, preferably 10–1 mol percent, of one or more compounds of the general formula

(II)

wherein $D_1$ represents an alkyl radical, a cycloalkyl radical, an aralkyl radical or an aryl radical and
$R_2$ represents hydrogen, a lower alkyl radical, a cycloalkyl radical, an aralkyl radical or an aryl radical and the radicals A represent carboxyl groups or their functional derivatives,

(III)

wherein $R_1$, $R_2$ and A have the abovementioned meaning and

(IV)

wherein $R_1$, $R_2$ and A have the abovementioned meaning, are reacted with copper salts or nickel salts optionally in the presence of nitrogen bases and catalysts according to processes which are in themselves known and the resulting crude phthalocyanines are optionally subjected to a customary forming process;

(B) 60–98 mol percent, preferably 75–96 mol percent, of benzene derivative which is optionally substituted by chlorine, bromine, lower alkyl, cycloalkyl, aralkyl, phenyl, alkoxy or sulphonic acid groups, and which contains two optionally cyclised substituents in the ortho-position, and which is capable of forming a tetraazaporphine ring, and 40–2 mol percent, preferably 25–4 mol percent, of one or more tetraazaporphines of the Formula I are reacted with copper salts or nickel salts optionally in the presence of nitrogen bases and catalysts, according to processes which are in themselves known, and the resulting crude phthalocyanines are subjected to a customary forming process;

(C) Mixtures of 60–98 mol perecnt, preferably 75–96 mol percent, of a copper phthalocyanine or nickel phthalocyanine which is optionally substituted by chlorine, bromine, lower alkyl, cycloalkyl, aralkyl, phenyl, alkoxy or sulphonic acid groups and 40–2 mol percent, preferably 25–4 mol percent, of one or more tetraazaporphines of the Formula I are manufactured and subjected to a customary forming process.

(D) Mixtures of 60–98 mol percent of a copper or nickel phthalocyanine which is optionally substituted by chlorine, bromine, lower alkyl, cycloalkyl, aralkyl, phenyl or alkoxy, and 40–2 mol percent of one or more tetraazaporphines of the formula

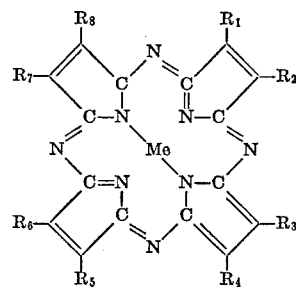

wherein

Me represents copper or nickel,
$R_1$ represents an alkyl radical, a cycloalkyl radical, an aralkyl radical or an aryl radical, and
$R_2$, $R_3$, $R_4$, $R_5$, $R_6$, $R_7$ and $R_8$ independently of one another represent hydrogen, an alkyl radical, a cycloalkyl radical, an aralkyl radical or an aryl radical, and wherein one or more of the pairs $R_3$ and $R_4$, $R_5$ and $R_6$ or $R_7$ and $R_8$ can be cyclised to give cycloaliphatic units or aromatic units which are optionally substituted by chlorine, bromine, lower alkyl, cycloalkyl, aralkyl, phenyl or alkoxy or units containing hetero-atoms are reacted with concentrated sulphuric acid which may contain $SO_3$.

A still further subject of the invention are dyestuffs obtainable according to A, B, C or D, especially dyestuffs containing sulphonic acid groups which are obtainable according to the process A.

It is known that phthalocyanines can be obtained in various crystal forms which are characterised by their X-ray diffraction spectrum. Of the known modifications of copper phthalocyanine, the β-form has a greenish-tinged blue colour shade, whilst the other modifications (α, γ, δ) are reddish-tinged blue. The β-form is more stable than the α-, γ- or δ-form as regards crystal formation in aromatic solvents and is therefore more suitable for incorporation into lacquers or paint compositions containing these solvents. The unstable α-, γ- and δ-forms show a strong tendency to recrystallisation in the presence of aromatic solvents, this recrystallisation being associated with a reduction in colour strength and a change in colour shade. Processes have however become known for preventing this tendency to recrystallise (compare Moser and Thomas, Phthalocyanine Compounds, 1963, page 165 and thereafter) and also for rendering the inherently unstable phthalocyanine modifications stable to solvents. To manufacture an α-modification which is stable to solvents, the method of partial chlorination of the copper phthalocyanine is frequently employed, in which case, however, the disadvantage of a displacement in colour shade towards greenish-tinged blue must be accepted.

Surprisingly, the copper and nickel phthalocyanine pigments according to the invention, which are produced in high yield and excellent purity, are resistant to crystallisation and hence suffer neither a reduction in colour strength nor a change in colour shade on boiling in aromatic solvents, such as benzene, toluene or xylene. Depending on the nature of the manufacturing process, with an optional subsequent forming process, it is possible to obtain a stable α-modification, a stable modification which in the X-ray diffraction spectrum resembles the γ-form, or the β-modification of the copper phthalocyanine or nickel phthalocyanine. The α-modification is preferred.

Besides, the sulphonic acid group-containing mixtures, according to the invention, are resistant to flocculation.

As a result of the relatively small proportions of the compounds of the Formula I in the pigment mixture, the colour shade of the copper phthalocyanines or nickel phthalocyanines remains practically unchanged. In contrast, for example, to the solvent-resistant chlorine-containing copper phthalocyanine pigments, which contain about 0–65 mol percent of copper phthalocyanine and about 100–35 mol percent of chlorinated copper phthalocyanines, and which are therefore distinctly greener in colour shade than the pure copper phthalocyanine, the solvent-resistant chlorine-free copper phthalocyanine pigments according to the invention, containing the compounds of the Formula I, show a colour shade similar to that of pure copper phthalocyanine, which is frequently very desirable.

Possible starting substances for the processes A and B are, according to the invention, phthalic acids or functional derivatives thereof, including phthalodinitriles and 3-iminoisoindolines or ring systems containing heteroatoms, which are optionally substituted by chlorine, bromine, lower alkyl, cycloalkyl, aralkyl, phenyl, alkoxy or sulphonic acid groups. For example, it is possible to use: phthalic anhydride, phthalic acid, phthalic acid esters, such as phthalic acid dimethyl ester, phthalic acid diethyl ester, phthalic acid mono-n-butyl ester, phthalic acid di-n-butyl ester, phthalic acid di-isobutyl ester, phthalic acid mono-octyl ester, phthalyl chloride, phthalate salts, such as for example the ammonium salt, the alkali salts, such as the sodium salt or potassium salt, or a salt of the metal which is to be fixed in the phthalocyanine molecule, phthalic acid diamide,
phthalimide,
4-chloro-phthalic anhydride,
4-bromo-phthalic anhydride,
4-methyl-phthalic anhydride,
4-phenyl-phthalic anhydride,
3-sulpho phthalic acid,
4-sulphophthalic acid,
4-methoxyphthalic anhydride,
4-ethoxy-phthalic anhydride,
phthalodinitrile,
4-chloro-phthalodinitrile,
3,4-dicyanodiphenyl,
4-methoxy-phthalodinitrile,
2,3-dicyano-pyridine,
tetrahydrophthalodinitrile,
1,3-diimino-isoindoline,
1,3-diimino-5-phenyl-isoindoline,
1,3-diimino-5-methoxy-isoindoline,
1,3-diimino-4-aza-isoindoline,
1,3-diimino-4,7-dithia-4,5,6,7-tetrahydro-isoindoline, as wel as the adducts of alcohols, such as methanol, ethanol or glycol, of secondary amines, such as piperidine, and of hydrogen halide, such as hydrogen bromide, to phthalodinitrile, or mixtures of these compounds.

The compounds of the General Formulae II to IV used for the process A are substituted maleic acids, fumaric acids or succinic acids or their functional derivatives, such as the anhydrides, esters, salts, amides, imides, nitriles or 2,5-di-substituted pyrrolines or pyrrolidines. As such it is for example possible to use:

$\alpha,\alpha'$-dimethyl-maleic anhydride,
$\alpha$-methyl-$\alpha'$-ethyl-maleic anhydride,
$\alpha$-methyl-$\alpha'$-isopropyl-maleic anhydride,
$\alpha$-methyl-$\alpha'$-n-butyl-maleic anhydride,
$\alpha$-methyl-$\alpha'$-cyclohexyl-maleic anhydride,
phenyl-maleic anhydride,
$\alpha$-methyl-$\alpha'$-phenyl-maleic anhydride,
$\alpha$-methyl-$\alpha'$-benzyl-maleic anhydride,
$\alpha,\alpha'$-diphenyl-maleic anhydride,
$\alpha,\alpha'$-diphenyl-maleic acid,
$\alpha,\alpha'$-diphenyl-maleimide,
$\alpha$-methyl-$\alpha'$-cyclohexyl-fumaric acid,
$\alpha$-methyl-$\alpha'$-phenyl-fumaric acid,
$\alpha$-methyl-$\alpha'$-benzyl-fumaric acid,
$\alpha,\alpha'$-diphenyl-fumaric acid,
$\alpha,\alpha'$-dimethyl-succinic anhydride,
$\alpha$-methyl-$\alpha'$-ethyl-succinic anhydride,
$\alpha$-methyl-$\alpha'$-cyclohexyl-succinic anhydride,
phenyl-succinic anhydride,
$\alpha$-methyl-$\alpha'$-phenyl-succinic anhydride,
$\alpha,\alpha'$-diphenyl-succinic anhydride,
$\alpha$-methyl-$\alpha'$-ethyl-succinic acid,
$\alpha$-methyl-$\alpha'$-ethyl-succinimide,
$\alpha,\alpha'$-diphenyl-succinimide,
phenyl-succinic acid,
$\alpha,\alpha'$-diphenyl-succinic acid,
$\alpha,\alpha'$-diphenyl-succinic acid dimethyl ester,
$\alpha,\alpha'$-diphenyl-succinic acid diethyl ester,
$\alpha,\alpha'$-diphenyl-succinic acid diamide,
$\alpha,\alpha'$-dimethyl-maleic acid dinitrile,
$\alpha$-methyl-$\alpha'$-ethyl-maleic acid dinitrile,
$\alpha$-methyl-$\alpha'$-isopropyl-maleic acid dinitrile,
$\alpha$-methyl-$\alpha'$-cyclohexyl-maleic acid dinitrile,
phenyl maleic acid dinitrile,
$\alpha$-methyl-$\alpha'$-phenyl-maleic acid dinitrile,
$\alpha$-methyl-$\alpha'$-benzyl-maleic acid dinitrile,
$\alpha,\alpha'$-diphenyl-maleic acid dinitrile,
$\alpha$-phenyl-$\alpha'$-benzyl-maleic acid dinitrile,
$\alpha,\alpha'$-dimethyl-fumaric acid dinitrile,
$\alpha$-methyl-$\alpha'$-ethyl-fumaric acid dinitrile,
$\alpha$-methyl-$\alpha'$-isopropyl-fumaric acid dinitrile,
$\alpha$-methyl-$\alpha'$-cyclohexyl-fumaric acid dinitrile,
phenyl-fumaric acid dinitrile,
$\alpha$-methyl-$\alpha'$-phenyl-fumaric acid dinitrile,
$\alpha$-methyl-$\alpha'$-benzyl-fumaric acid dinitrile,
$\alpha,\alpha'$-diphenyl-fumaric acid dinitrile,
$\alpha$-phenyl-$\alpha'$-benzyl-fumaric acid dinitrile,
$\alpha$-n-propyl-$\alpha'$-phenyl-succinic acid dinitrile,
$\alpha,\alpha'$-diphenyl-succinic acid dinitrile,
$\alpha$-phenyl-$\alpha'$-chlorophenyl-succinic acid dinitrile,
$\alpha$-phenyl-$\alpha$-isopropylphenyl-succinic acid dinitrile,
$\alpha$-phenyl-$\alpha'$-p-methoxyphenyl-succinic acid dinitrile,
$\alpha$-phenyl-$\alpha'$-(3,4-methylene-dioxyphenyl)-succinic acid dinitrile,
$\alpha,\alpha'$-di-p-chlorophenyl-succinic acid dinitrile,
$\alpha$-p-chlorophenyl-$\alpha'$-p-methoxyphenyl-succinic acid dinitrile,
2,5-diimino-3,4-dimethyl-$\Delta$3-pyrroline,
2,5-diimino-3-methyl-4-ethyl-$\Delta$3-pyrroline,
2,5-diimino-3-methyl-4-isopropyl-$\Delta$3-pyrroline,
2,5-diimino-3-methyl-4-cyclohexyl-$\Delta$3-pyrroline,
2,5-diimino-3-methyl-4-phenyl-$\Delta$3-pyrroline,
2,5-diimino-3-methyl-4-benzyl-$\Delta$3-pyrroline,
2,5-diimino-3,4-diphenyl-$\Delta$3-pyrroline,
2,5-diimino-3-cyclohexyl-$\Delta$3-pyrroline or their tautomeric compounds;

2,5-diimino-3,4-dimethylpyrrolidine,
2,5-diimino-3-methyl-4-ethyl-pyrrolidine,
2,5-diimino-3-methyl-4-isopropyl-pyrrolidine,
2,5-diimino-3-methyl-4-cyclohexyl-pyrrolidine,
2,5-diimino-3-methyl-4-phenyl-pyrrolidine,
2,5-diimino-3-methyl-4-benzyl-pyrrolidine,
2,5-diimino-3,4-diphenyl-pyrrolidine,
2,5-diimino-3-cyclohexyl-pyrrolidine or their tautomeric compounds, as well as the adducts of secondary amines, such as piperidine, of alcohols, such as methanol, ethanol or glycol, to the said dinitriles, and their hydrogen halide addition compounds, such as the hydrogen bromide addition compounds.

The tetraazaporphines of the Formula I, used for the processes B and C, can be obtained according to known processes, for example from 3 to 1 mol of phthalic anhydride or phthalodinitrile and 1 to 3 mols of one or more compounds of the Formulae II–IV in the presence of copper salts or nickel salts. Depending on the nature of the phthalic acids or their functional derivatives, used as starting substances, and on the nature of the compounds of the General Formulae II–IV, there are three possible variants for the processes A and B according to the invention:

(1) The urea process, wherein phthalic anhydride, phthalic acid, phthalic acid esters, phthalate salts, phthalic acid diamide or phthalimide, which are optionally substituted by chlorine, bromine, lower alkyl, cycloalkyl, aralkyl, phenyl, alkoxy or sulphonic acid groups or mixtures of these compounds are used as the starting material. It is carried out by heating 85 to 99.5 mol percent of these compounds and 15–0.5 mol percent of one or more compounds of the General Formulae II–IV, preferably 90–99 mol percent of phthalic anhydride or its equivalents, mentioned in column 5, and 10–1 mol percent of one or more compounds of the General Formulae II–IV, with a metal donor, such as the inorganic salts, for example the chlorides, bromides, nitrates, phosphates, borates and sulphates, of copper or nickel, the organic salts, such as the acetates, oxalates, succinates and phthalates, of copper or nickel, the oxides of copper or nickel, the free metals or mixtures of these metal-donating substances, and with a nitrogen donor, such as urea and its derivatives, such as biuret, guanidine and dicyandiamide or their mixtures, optionally with the addition of ammonium salts, such as ammonium chloride, in an inert high-boiling organic solvent, such as nitrobenzene, trichlorobenzene, o-dichlorobenzene, naphthalene or mixtures of such solvents, in the presence of a catalyst which promotes the formation of the metal phthalocyanine, such as especially the oxides, oxygen-containing acids or salts of the oxygen-containing acids of molybdenum or tungsten. The amounts of the additives in the reaction mixture can vary over a wide range. For example it is possible to use, relative to the amount of phthalic anhydride or its equivalent and the compound or compounds of the General Formulae II–IV:

(a) the metal donor in an amount of between about 0.2 to about 0.5 gram atom of metal or its equivalent of metal salt, relative to 1 mol of phthalic anhydride or its equivalent,
(b) urea or another nitrogen donor in a 1- to 4-fold amount by weight,
(c) between 0.4 and 1.5 mols of ammonium chloride per mol of phthalic anhydride or its equivalent,
(d) the solvent in at least such an amount that the reaction mixture becomes stirrable and
(e) a catalyst for the formation of the metal phthalocyanine, such as for example molybdenum oxide, molybdic acid, phosphomolybdic acid, phosphotungstic acid or its ammonium salts, preferably ammonium molybdate, with the catalyst usually being employed in relatively small amounts such as approximately from 0.1 to 4 millimols, relative to 1 mol of phthalic anhydride or its equivalent.

The urea process is usually carried out at elevated temperature, that is to say at a temperature of about 150 to about 250° C., preferably in the range of about 175–210° C. In the course of doing so, the insoluble phthalocyanines precipitate and can be isolated in the usual manner, for example by being filtered off. The material obtained by filtration is freed of the solvent by steam distillation or by washing with methanol and the solvent-free residue is acidified. The suspension is filtered and the product is washed until free of acid, optionally further suspended in dilute aqueous sodium hydroxide solution, filtered, washed and dried. In this way the metal-containing phthalocyanines are obtained in a very pure form and in high yield. They are initially predominantly present in the more or less coarsely crystalline $\beta$-modification. From this, a very pure micro-crystalline $\beta$-modification of optimum particle size can be obtained by known processes, such as for example by grinding in the dry or moist form, cold or warm, with or without the addition of grinding aids, such as sodium chloride or sodium sulphate, optionally with the addition of organic agents, especially aromatic hydrocarbons and their derivatives, preferably xylene, or alcohols, ketones or esters.

The conversion of the $\beta$-modification, thus obtained, into an $\alpha$-modification which is stable to solvents can be achieved by dissolving the former in concentrated sulphuric acid and reprecipitating it by stirring into water at room temperature or elevated temperature, during which attention must be given to good stirring and the correct speed of running in, and also by swelling the former in sulphuric acids of appropriate concentration, for example in 62–72% strength sulphuric acid, and subsequent hydrolysis of the resulting sulphates with water. To achieve soft particles, it has proved advisable to add surface-active agents during the hydrolysis reaction. Suitable surface-active agents are, for example, those based on long-chain alkyl-sulphonates, and those based on adducts of ethylene oxide to oleyl alcohol and nonylphenol. Soft particles can also be achieved through the conjoint use of non-aqueous liquids. After drying, solvent-resistant copper phthalocyanine and nickel phthalocyanine pigments of the $\alpha$-modification are obtained in high yield and excellent purity, these pigments being distinguished by outstanding colour strength and having an optimum specific surface area for pigments.

(2) The dinitrile process using phthalodinitrile, which is optionally substituted by chlorine, bromine, lower alkyl, cycloalkyl, aralkyl, phenyl, alkoxy or sulphonic acid groups as the starting material. It is carried out by heating 85–99.5 mol percent, preferably 90–99 mol percent, of these compounds and 15–0.5 mol percent, preferably 10–1 mol percent, of one or more dinitriles or their equivalents of the General Formulae II–IV, with a metal donor, for example with the copper salts or nickel salts usually employed, such as the copper or nickel acetates or sulphates or especially the chlorides or mixtures of these salts, and nitrogen bases, such as ammonia or organic bases, especially tertiary organic bases, such as pyridine or quinoline, in an inert high-boiling organic solvent, such as o-dichlorobenzene, trichlorobenzene or especially nitrobenzene or mixtures of these solvents, optionally in the presence of a catalyst which assists the formation of the metal phthalocyanine, such as especially the oxides, oxygen-containing acids or salts of the oxygen-containing acids of molybdenum or tungsten or the halides or carbonyl compounds of titanium, molybdenum or iron. The amounts of the additives in the reaction mixture can be varied within wide limits. For example it is possible to use, relative to the total quantity of the dinitriles or their equivalents:

(a) the metal donor in an amount of about 0.2 to about 0.5 gram atom of metal in the metal salt, relative to 1 mol of dinitrile,
(b) between about 0.1 and 2 mols of the nitrogen base per mol of dinitrile,
(c) the solvent in at least such an amount that the reaction mixture can be stirred, for example in a 2- to 8-fold amount by weight, and
(d) a catalyst for the formation of the metal phthalocyanine, corresponding to the substances used in the urea process, preferably molybdic acid or ammonium molybdate, for example in amounts of 0.1 to 2 millimols, relative to 1 mol of dinitrile.

The dinitrile process is usually carried out at a temperature of about 150 to about 250° C., preferably in the range of about 190–220° C.

The insoluble phthalocyanines can be isolated from the reaction mixture in a manner corresponding to the urea process, but in the dinitrile process the after-treatment of the material which has been filtered off with dilute acid and dilute alkali can be omitted because of the small proportion of by-products. Here again, solvent-resistant and intensely coloured copper phthalocyanine and nickel phthalocyanine pigments of the $\alpha$-modification or β-modification are obtained in high yield and excellent purity by an appropriate forming process.

The manufacture of the copper phthalocyanine and nickel phthalocyanine pigments according to the invention by the dinitrile process can also be carried out without solvents in a sintering melt (compare Ullmans Encyklòpädie der Technischen Chemie (Ullmanns Encyclopedia of Industrial Chemistry), 3d Edition, vol. 13, page 705), in which case the crude pigment dyestuff is separated off and formed in the manner described above or is ground or kneaded, without being separated off, with or without organic liquids and/or solids.

(3) The isoindoline process using 3-imino-isoindolines which are optionally substituted, especially by chlorine, bromine, lower alkyl, cycloalkyl, aralkyl, phenyl or alkoxy, as the starting material. It is carried out by heating 85–99.5 mol percent of these compounds and 15–0.5 mol percent of one or more dinitriles or 2,5-disubstituted pyrrolines or pyrrolidines of the General Formulae II–IV, preferably 90–99 mol percent of 3-imino-isoindolines and 10–1 mol percent of one or more dinitriles or 2,5-disubstituted pyrrolines or pyrrolidines of the General Formulae II–IV, with a metal donor, for example copper or nickel chlorides, bromides or sulphates, preferably the copper or nickel salts of aliphatic or aromatic monocarboxylic acids or dicarboxylic acids, such as the acetates, oxalates, succinates, phthalates or the salts of glycine, alanine or sarcosine, in an organic solvent, preferably in polyhydric alcohols, such as ethylene glycol, diethylene glycol, triethylene glycol, propylene glycol, trimethylene glycol, the butanediols or glycerol. The amounts of the additives in the reaction mixture can vary within wide limits. For example it is possible to use, relative to the total quantity of the isoindolines or their equivalents:

(a) the metal donor in a stoichiometric quantity ratio or slightly deviating therefrom, for example within the ratio 3.5–4.5 mols of isoindolines per 1 mol of metal salt, and
(b) the solvent in at least such amounts that the reaction mixture can be easily stirred, for example in a 2- to 8-fold amount by weight.

The isoindoline process is carried out at elevated temperature, but below 190° C., for example between 100 and 185° C. Preferred temperatures for the manufacture of copper phthalocyanines are 110–140° C., and for nickel phthalocyanines 140–180° C. The insoluble pigments are isolated from the reaction mixture in the usual manner, for example by filtering off and subsequently washing the filter residue, it being possible to dilute the mixture with methanol or water before filtering off. If desired, the surface-active agents usually employed, such as for example those based on long-chain alkylsulphonates as well as on ethylene oxide adducts to oleyl alcohol, nonylphenol or polyoxypropylene glycols, can be incorporated. In addition, arylsulphonates or aralkylsulphonates, ethylene oxide or propylene oxide adducts to carboxylic acids, amines, phenols and alcohols, as well as ammonium compounds and long-chain amines or cycloaliphatic amines, can also be employed with good success. After drying, solvent-resistant copper phthalocyanine and nickel phthalocyanine pigments are obtained, in high yield and excellent purity, which already possess optimum pigment properties and which therefore—in contrast to the phthalocyanines obtained by the urea process or the dinitrile process—do not require any after-forming process. Their X-ray diffraction spectrum resembles that of the γ-crystal form described in U.S. patent specification 2,770,629, but differences in the crystal plane spacings and the intensities are found, as is explained in some examples.

The resistance to flocculation of the solvent-resistant copper phthalocyanine pigments and nickel phthalocyanine pigments which do not contain sulphonic acid groups and which can be manufactured, according to the invention, by the urea process, the dinitrile process or the isoindoline process, can be improved for example by incorporating during or after the phthalocyanine synthesis, in a manner which is in itself known, small quantities of further metal phthalocyanines, such as tin phthalocyanines, vanadium phthalocyanines or manganese phthalocyanines, or phthalocyanine derivatives, such as for example benzoyl phthalocyanines, N-substituted phthalocyanine sulphonamides, optionally N-substituted aminomethyl-phthalocyanines or hydroxymethylphthalocyanines, and also resins, abietic acid, other resin acids or their alkaline earth salts or resinous amines, such as abietylamine.

Another method of obtaining resistance to flocculation is the introduction of sulphonic acid groups into sulphonic acid group-free copper and nickel phthalocyanine pigments containing 60–98 mol percent of a copper or nickel phthalocyanine which is optionally substituted by chlorine, bromine, lower alkyl, cycloalkyl, aralkyl, phenyl or alkoxy, and 40–2 mol percent of one more tetraazaporphines of the formula

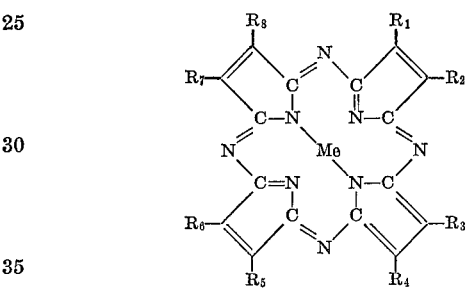

wherein

Me represents copper or nickel, $R_1$ represents an alkyl radical, a cycloalkyl radical, an aralkyl radical or an aryl radical, and $R_2$, $R_3$, $R_4$, $R_5$, $R_6$, $R_7$ and $R_8$ independently of one another represent hydrogen, an alkyl radical, a cycloalkyl radical, an aralkyl radical or an aryl radical, and wherein one or more of the pairs $R_3$ and $R_4$, $R_5$ and $R_6$ or $R_7$ and $R_8$ are cyclised to give cycloaliphatic units or aromatic units which are optionally substituted by chlorine, bromine, lower alkyl, cycloalkyl, aralkyl, phenyl or alkoxy groups or units containing heteroatoms.

For this purpose sulphonic acid groups-free copper and nickel phthalocyanine pigments are reacted with concentrated sulphuric acid which may contain $SO_3$. The reaction is preferably carried out at elevated temperature, e.g. above about 30° C., preferably at temperatures between about 30° C. and about 80° C.

Another method for the manufacture of flocculation resistant copper and nickel phthalocyanine pigments is the synthesis of these pigments in the presence of sulphonic group-containing starting material containing two ortho-positioned, optionally cyclised substituents and being capable of forming a tetraazaporphine ring.

Finally, these sulphonic acid group-free pigments can be mixed with metal (copper or nickel) phthalocyanine sulphonic acids. The mixing is preferably conducted in form of an aqueous suspension, optionally at elevated temperature, e.g. between about 30° C. to about 70° C., preferably at temperatures between about 40° C. and about 60° C.

The brilliance, the stability to flocculation and the distributability in organic media, and hence also the colour strength, of these pigments can be improved by adding 1–30%, preferably 2–10%, of a resin acid or its alkaline earth salts. The resin acids are preferably added by adding the alkaline solution of the salt of a resin acid to the pigment dispersion and subsequently precipitating the free resin acid or its alkaline earth salts by adding acids or alkaline earth salts. Possible resin acids are all natural or synthetic types of resin which contain one or more acid groups in the molecule, for example colophony or resins with a predominant proportion of colophony, hydrogenated or dimerised colophony resins, saponifiable maleate resins, colophony-modified phenolic resins or saponifiable oil-free alkyd resins.

The dried pigment powders are suitable for the pigmentation of lacquers of all kinds, for the manufacture of printing inks, distempers or binder paints, and for the bulk dyeing of synthetic, semi-synthetic or natural macromolecular substances, such as for example polyvinyl chloride, polystyrene, polyamide or polyethylene. They can also be used for the spin dyeing of natural, regenerated or artificial fibres, such as for example cellulose fibres, polyester fibres, polyacrylonitrile fibres or polyamide fibres, and for printing textiles and paper. Finely divided, stable aqueous pigment dispersions, which are for example suitable for pigmenting dispersion paints and other paints, for colouring paper, for pigment-printing textiles or for spin dyeing viscose, can be manufactured from these pigments by grinding or kneading in the presence of non-ionic, anionic or cationic surface-active agents.

In the examples which follow, unless otherwise stated, the parts denote parts by weight and the percentages denote percentages by weight.

EXAMPLE 1

(A) Manufacture of the crude copper phthalocyanine

A mixture of 50 parts of phthalic anhydride and 100 parts by volume of nitrobenzene is heated to 90–100° C. 78 parts of urea, 6 parts of ammonium chloride, 11 parts of basic copper sulphate, 0.1 part of ammonium molybdate and 8 parts of $\alpha,\alpha'$-diphenylmaleic anhydride are introduced at this temperature, and the mass is warmed to 130–135° C. whilst stirring, until it has practically finished foaming. It is then gradually heated to 160–170° C., the temperature is kept thereat for 3 hours and raised to 200–205° C. over the course of one hour, and the mixture is stirred for a further 2–3 hours at this temperature. The reaction mixture is then cooled to approx. 80° C. and diluted with methanol, and the product is filtered off and washed with methanol. The filter cake is stirred for 1 hour at 90–100° C. in 1000 parts of 5% strength hydrochloric acid and the product is filtered off and washed until free of acid. The material which has been filtered off is then once again suspended in 1000 parts of 5% strength aqueous sodium hydroxide solution, the alkaline suspension is stirred for 1 hour at 80–90° C., and the product is filtered off, washed until free of alkali and dried. Approx. 49 parts, that is to say 91–92% of theory, of a coarsely crystalline crude copper phthalocyanine are thus obtained.

If, instead of nitrobenzene, 100–150 parts by volume of trichlorobenzene are used, a copper phthalocyanine of equal quality is obtained.

The reaction mixture can also be worked up by not diluting it with methanol, but evaporating it to dryness in a suitable rotating vessel in vacuo at about 90–120° C. and subsequently digesting the residue with dilute hydrochloric acid and dilute sodium hydroxide solution, as above.

Furthermore, the reaction mixture can also be worked up by filtering it, steam-distilling the material left on the filter in order to remove adhering solvent, and treating the residue with dilute aqueous acid and dilute aqueous alkali under warm conditions.

In both cases the quality of the crude copper phthalocyanine obtained corresponds to that resulting from working up with methanol.

(B) Forming (1) 10 parts of crude copper phthalocyanine are ground in a ball mill with 130 parts of anhydrous sodium sulphate in the presence of 1.4 parts of xylene, until a microscopic examination no longer shows any coarse crystals of the copper phthalocyanine (duration approx. 48 hours). The ground material is eluted with water warmed to 60° C., filtered off, washed with warm water and dried at 60° C. in vacuo. A solvent-resistant copper phthalocyanine pigment of the micro-crystalline $\beta$-modification is obtained.

(2) 6 parts of crude copper phthalocyanine are dissolved in 40 parts by volume of concentrated sulphuric acid. The solution is stirred for 1 hour at ordinary temperature and is then stirred in a thin stream into 1000 parts of water, with a good swirling action. The resulting suspension is stirred for 1 hour at 80–90° C. in the presence of 0.3 part of an emulsifier which consists of a mixture of a long-chain alkylsulphonate, an oxethylated nonylphenol and an oxethylated oleyl alcohol, and the product is filtered off hot, washed with warm water and dried at 60° C. in vacuo. A copper phthalocyanine pigment of the $\alpha$-modification is obtained. The specific surface area is about 50 m.$^2$/g.

(Test of stability to solvents: 3 parts of the resulting pigment are heated in 100 parts by volume of toluene for 1 hour under reflux, then filtered off, washed with a little toluene and dried at 60° C. in vacuo. The sample shows no crystallisation and no change in colour shade; it continues to be the pure $\alpha$-modification.)

10 parts of crude copper phthalocyanine are introduced into 80 parts by volume of 70% strength sulphuric acid at ordinary temperature. The suspension is stirred for 24 hours and subsequently poured into 1200 parts of water. The dyestuff is filtered off, washed until free of acid, and again stirred up with 500 parts of water, and the suspension is rendered weakly alkaline with ammonia and stirred for 1 hour at 80–90° C. in the presence of 0.5 part of the emulsifier used above. After filtering off, washing and drying at 60° C. in vacuo, a copper phthalocyanine pigment in the $\alpha$-modification, which is stable to solvents, is obtained.

EXAMPLE 2

8 parts of the copper phthalocyanine pigment in the $\alpha$-form, obtained according to Example 1(B2), are ground on an automatic Hoover-Muller grinder with a stoving lacquer of 25 parts of coconut oil alkyd resin (40% coconut oil), 10 parts of melamine resin, 50 parts of toluene and 7 parts of glycol monomethyl ether. The mixture is applied onto the substrate to be lacquered, the lacquer is cured by stoving at 130° C., and blue lacquerings of high covering power are obtained, which possess very good fastness to overlacquering, outstanding fastness to light and weathering, and high brilliance.

Pigmented stoving lacquers of equal fastness properties are obtained if 15–25 parts of the alkyd resin mentioned, or of an alkyd resin based on cottonseed oil, castor oil or synthetic fatty acids are used, and if instead of the indicated amount of melamine resin 10–15 parts of the melamine resin mentioned, or of a condensation product of formaldehyde with urea or benzoguanamine are employed. Pigmented stoving lacquers of similar good fastness properties, having a somewhat greener colour shade, are obtained if instead of the indicated pigment the corresponding amount of the copper phthalocyanine pigment in the $\beta$-form, obtained according to Example 1(B1), is used.

If, instead of the indicated amount of pigment, 1 to 10 parts of a mixture of titanium dioxide (rutile type) with the pigment obtained in Example 1(B2), in the ratio of 0.5–50:1, is ground into the lacquer indicated above, and further processing is the same, lacquerings of equal fastness properties and with a blue colour shade which is displaced towards white with increasing titanium dioxide content are obtained. Lacquerings with similar fastness properties are obtained on using physically drying spirit lacquers, varnish lacquers and nitro lacquers, air-drying oil, synthetic resin and nitro combination lacquers, and stoving and air-drying epoxide resin lacquers, optionally in combination with urea, melamine, alkyd or phenolic resins.

If reactive lacquers based on unsaturated polyester resin or amine-curing epoxide resin lacquers with dipropylenetriamine as the amine component are used, blue lacquerings of outstanding fastness to weathering and efflorescence are obtained.

Pigmentations of similar fastness are obtained on using other two-component lacquers based on aromatic or aliphatic isocyanates and polyethers or polyesters containing hydroxyl groups, and also with moisture-drying polyisocyanate lacquers which yield polyurea lacquerings.

EXAMPLE 3

30 parts of the pigment powder obtained according to Example 1(B2) are kneaded with 10 parts of an oxethylated alkylphenol in a dispersion kneader, for example of the Werner and Pfleiderer system, and the mixture is subsequently diluted with 60 parts of water whilst kneading. Instead of the dispersion kneader, a ball mill or a high speed stirred ball mill, filled with balls of 0.1–0.8 mm. diameter, can also be used as the comminution equipment.

5 parts of this fine paste are mixed with 10 parts of baryte as the filler, 10 parts of titanium dioxide (rutlie type) as a white pigment and 40 parts of an aqueous dispersion paint containing approx. 50% of polyvinyl acetate. The paint is brushed out and after drying blue paint films of very good fastness to lime and cement and outstanding fastness to weathering and to light are obtained.

The fine paste thus obtained is equally suitable for pigmenting clear polyvinyl acetate dispersion paints, for dispersion paints which contain copolymers of styrene and maleic acids as binders, as well as dispersion paints based on polyvinyl propionate, polymethacrylate or butadiene-styrene, and glue-based paints, containing chalk, for painting over wallpaper.

Paint films of a somewhat greener, similar colour shade and similar fastness properties are obtained if instead of the indicated pigment corresponding quantities of the pigment obtained according to Example 1(B1) are used.

As dispersing agents, it is also possible to use other non-ionic emulsifiers, such as the reaction products of nonylphenol with ethylene oxide, or ionic wetting agents, such as the sodium salts of alkylarylsulphonic acids, for example of dinaphthylmethanedisulphonic acid, sodium salts of substituted sulpho-fatty acid esters and sodium salts of paraffinsulphonic acids in combination with alkylpolyglycol ethers.

EXAMPLE 4

A mixture of 65 parts of polyvinyl chloride, 35 parts of diisoctyl phthalate, 2 parts of dibutyl-tin mercaptide, 0.5 part of titanium dioxide and 0.5 part of the pigment obtained according to Example 1(B2) is pigmented on a roll mill at 165° C. An intensely blue-coloured mass is obtained, which can be used for the manufacture of films or mouldings. The coloration is distinguished by outstanding fastness to light, very good fastness to plasticisers and high brilliance.

Colorations of a somewhat greener shade and similar fastness properties are obtained if the α-copper phthalocyanine is replaced by equal amounts of the β-copper phthalocyanine obtained according to Example 1(B1).

Blue mouldings of high brilliance and very good fastness to light and to migration are obtained if 0.2 part of the indicated pigments is mixed with 100 parts of polyethylene, polypropylene or polystyrene granules and the mixture is directly moulded in an injection moulding machine at 220° C. to 280° C., or is processed in an extruder to give coloured rods or on a roll mill to give coloured hides. The hides or rods are optionally granulated and the product moulded in an injection moulding machine.

In a similar manner it is possible to colour synthetic polyamides from caprolactam or adipic acid and hexamethylenediamine, or condensates of terephthalic acid and ethylene glycol, at 280–300° C., under a nitrogen atmosphere if appropriate.

If 1 part of the pigment obtained according to Example 1(B2) is mixed with 10 parts of titanium dioxide (rutile type) and 100 parts of a copolymer, in powder form, based on acrylonitrile-butadiene-styrene, and the mixture is coloured on a roll mill at 140–180° C., a blue hide is obtained, which is granulated, and the product is moulded in an injection moulding machine at 200–250° C. Clear blue mouldings having very good fastness to light and to migration as well as excellent heat resistance and colour saturation are obtained.

Plastics based on cellulose acetate, cellulose butyrate and their mixtures are coloured in a similar manner, but at temperatures of 180–220° C. and without the addition of titanium dioxide, to give similar fastness properties.

Blue transparent granules of outstanding fastness to light and heat resistance, and high brilliance, are obtained if 0.2 part of the indicated pigments are mixed with 100 parts of a plastic based on polycarbonate in an extruder or in screw kneader at 250–280° C. and the mixture is processed into granules.

EXAMPLE 5

90 parts of a slightly branched polypropylene glycol of molecular weight 2500 and hydroxyl number 56, 0.25 part of endoethylenepiperazine, 0.3 part of tin-(II) octoate, 1.0 part of a polyether-siloxane, 3.5 parts of water and 12.0 parts of a ground paste of 10 parts of the pigment obtained according to Example 1(B2) in 50 parts of the indicated polypropylene glycol are well mixed with one another and subsequently intimately mixed with 45 parts of toluylenediisocyanate (80% of 2,4-isomer and 20% of 2,6-isomer), and the mixture is poured into a mould. It turns cloudy after 6 seconds, and the formation of the foam takes place. After 70 seconds, an intensely blue-coloured, soft polyurethane foam has formed, the pigmentation of which shows outstanding fastness to light and brilliance.

A blue soft polyurethane foam of equally light-fast pigmentation is obtained if 90 parts of a slightly branched polyester from adipic acid, diethylene glycol and trimethylolpropane, having a molecular weight of 2000 and a hydroxyl number of 60, are mixed with the following components: 1.2 parts of dimethylbenzylamine, 2.5 parts of sodium castor oil-sulphate, 2.0 parts of an oxethylated, benzylated hydroxydiphenyl, 1.75 parts of water and 12 parts of a paste manufactured by grinding 10 parts of the pigment obtained according to Example 1(B2) in 50 parts of the polyester indicated above, and if after mixing whilst stirring, 40 parts of toluylenediisocyanate (65% of 2,4-isomer and 35% of 2,6-isomer) are stirred in and the mixture is poured into a mould and diluted.

Blue soft polyurethane foams of a similarly light-fast pigmentation are obtained if the indicated pigment is replaced by equal quantities of the pigment obtained according to Example 1(B1).

EXAMPLE 6

Blue offset prints of high brilliance and colour strength and very good fastness to light and lacquering are obtained with a printing ink manufactured by grinding 35 parts of the pigment obtained according to Example 1(B2) and 65 parts of linseed oil and adding 1 part of drier (Co naphthenate, 50% strength in white spirit). The use of this printing ink in letterpress printing, photographic printing, lithographic printing or gravure printing yields blue prints of similar fastness properties. If the pigment is used for colouring tinplate printing inks or low viscosity gravure printing inks or other printing inks, blue prints of similar fastness properties are obtained.

If the pigment is replaced by equal amounts of the pigment manufactured according to Example (B1), brilliant greenish-tinged blue prints of similar fastness are obtained.

EXAMPLE 7

A printing paste is prepared from 10 parts of the fine pigment paste indicated in Example 3, 100 parts of 3% strength tragacanth, 100 parts of an aqueous 50% strength egg albumen solution and 25 parts of a non-ionic wetting agent.

A textile fibre fabric is printed and steamed at 100° C., and a blue print is obtained which is distinguished by excellent fastness properties, especially fastness to light, and high brilliance. In the print mix, it is possible to use, in place of the tragacanth and egg albumen, other binders which can be used for fixing to fibres, for example binders based on synthetic resin, British gum or cellulose glycollate.

EXAMPLE 8

A mixture of 100 parts of light crepe, 2.6 parts of sulphur, 1 part of stearic acid, 1 part of mercaptobenzothiazole, 0.2 part of hexamethylenetetramine, 5 parts of zinc oxide, 6 parts of chalk and 2 parts of titanium dioxide (anatase type) is coloured on a roll mill, at 50° C., with 2 parts of the pigment obtained according to Example 1(B2), and then vulcanised for 12 minutes at 140° C. A blue-coloured vulcanised product having very good fastness to light is obtained.

EXAMPLE 9

22,500 parts of an aqueous viscose solution of approximately 9% strength are added to 100 parts of a 20% strength aqueous fine paste, manufactured as in Example 3, in a stirred vessel. The coloured mass is stirred for 15 minutes, subsequently de-aerated, and subjected to a spinning and desulphurisation process. Blue-coloured filaments or films having very good fastness to light are obtained.

Blue-pigmented filaments or films of similar fastness are obtained if a 20% strength solution of acetylcellulose in acetone, or 15–25% strength solution of polyacrylonitrile in dimethylformamide, coloured with the pigment dyestuffs manufactured according to Example 1(B1) or (B2), is subjected to a dry spinning process.

EXAMPLE 10

10,000 parts of a paper pulp, containing 4 parts of cellulose per 100 parts, are treated for 2 hours in a hollander. During this time, the following are added at quarter-hour intervals: 4 parts of resin glue, followed by 30 parts of an approximately 15% strength pigment dispersion, obtained as in Example 3, using dinaphthylmethanesulphonate as the dispersing agent, and finally 5 parts of aluminium sulphate. After finishing on the papermaking machine, a blue-coloured paper of excellent fastness to light and fastness to solvents is obtained.

EXAMPLE 11

The blue-pigmented papers manufactured according to Example 10 are impregnated with a 55% strength solution of a urea-formaldehyde resin in n-butanol and stoved at 140° C. Blue laminate papers having very good fastness to migration and outstanding fastness to light are obtained.

A laminate paper of equal fastness properties is obtained by laminating a paper which was printed by the gravure printing process, using a printing ink which contains one of the fine pigment pastes indicated in Example 6 and water-soluble or saponifiable binders.

EXAMPLE 12

78 parts of urea, 20 parts of ammonium chloride and 0.1 part of ammonium molybdate are introduced into a mixture of 50 parts of phthalic anhydride and 100 parts by volume of nitrobenzene at 90–100° C. and the temperature is raised to 160–170° C. over the course of 1 hour. The mixture is stirred for 1 hour at this temperature and thereafter an intimate mixture of 11 parts of dry basic copper sulphate and 4 parts of $\alpha,\alpha'$-diphenyl-succinic acid dinitrile is introduced slowly (approximately over the course of 10 minutes). The temperature of the melt is kept at 160–170° C. for a further 2 hours and is then raised to 200–205° C. over the course of 1 hour, and the reaction is completed in about 2–3 hours at this temperature. Working up can be carried out in accordance with the various possibilities indicated in Example 1(A). About 48 parts of a coarsely crystalline crude copper phthalocyanine in the $\beta$-modification are obtained.

To determine the proportion of pure copper phthalocyanine 10 parts of crude copper phthalocyanine are dissolved in 65 parts by volume of 100% strength sulphuric acid and 18.8 parts of water are added dropwise to this solution with external cooling. From the 86% strength sulphuric acid thus obtained, the copper phthalocyanine which has crystallised out is filtered off on a glass frit and washed with 85% strength sulphuric acid. The filter cake is suspended in 200 parts of hot water, filtered off, washed until neutral and dried at 100° C. About 9.1 parts of pure copper phthalocyanine are obtained. A further 0.6 part of a greenish-blue product are precipitated from the 85 to 86% strength sulphuric acid of the filtrate by dropwise addition of water until a concentration of 60% is reached; this product substantially consists of copper tribenzodiphenyl-tetraazaporphine and still contains traces of copper phthalocyanine. Accordingly, the crude copper phthalocyanine contains approx. 91% of copper phthalocyanine and approx. 6% of copper tribenzodiphenyl-tetraazaporphine, corresponding to 92 mol percent of copper phthalocyanine and 5 mol percent of copper tribenzodiphenyl-tetraazaporphine.

If the crude copper phthalocyanine is subjected to a forming process according to the data of Example 1(B), a finely divided, intensely coloured, greenish-tinged blue copper phthalocyanine pigment in the $\beta$-modification or an intensely coloured, reddish-tinged blue, solvent-resistant copper phthalocyanine pigment in the $\alpha$-modification (specific surface area: approx. 54 m.$^2$/g.) are obtained.

The pigment thus obtained can be used for pigmenting the substrates indicated in Examples 2–11, with the same mode of use.

Intensely coloured and solvent-resistant copper phthalocyanine pigments are also obtained if the processes of Examples 1 and 12 are carried out with the phthalic acids or their functional derivatives, the copper salts and the compounds of the Formulae II–IV indicated in the table which follows.

| Phthalic acid or its functional derivative | Copper salt | Compound of the Formulae II-IV | Yield, parts |
| --- | --- | --- | --- |
| 50 parts of phthalic anhydride | 11 parts of basic copper sulphate | 8 parts of phenyl-maleic anhydride | 47 |
| Do | do | 7 parts of α-methyl-α'-phenyl-maleic anhydride | 46 |
| Do | do | 8 parts of α-methyl-α'-benzyl-maleic anhydride | 45 |
| Do | do | 8 parts of α-methyl-α'-n-butyl-maleic anhydride | 45 |
| Do | do | 8 parts of α-methyl-α'-cyclohexyl-maleic anhydride | 43 |
| Do | do | 8 parts of α,α'-diphenyl-maleic acid | 49 |
| Do | do | 6 parts of α,α'-diphenyl-maleimide | 50 |
| Do | do | 8 parts of α-methyl-α'-phenyl-fumaric acid | 43 |
| Do | do | 8 parts of α-α'-diphenyl-fumaric acid | 44 |
| Do | do | 7 parts of phenyl-succinic anhydride | 48 |
| Do | do | 8 parts of α-methyl-α'-phenyl-succinic anhydride | 45 |
| Do | do | 5 parts of α,α'-diphenyl-succinic anhydride | 48 |
| Do | do | 7 parts of phenyl-succinic acid | 45 |
| Do | do | 6 parts of α,α'-diphenyl-succinic acid | 49 |
| Do | do | 6 parts of α,α'-diphenyl-succinic acid dimethyl ester | 48 |
| Do | do | 6 parts of α,α'-diphenyl-succinic acid diamide | 50 |
| Do | do | 6 parts of α,α'-diphenyl-succinimide | 50 |
| Do | do | 6 parts of phenyl-maleic acid dinitrile | 48 |
| Do | do | 6 parts of α,α'-diphenyl-fumaric acid dinitrile | 47 |
| Do | do | 5 parts of α,α'-diphenyl-succinic acid dinitrile | 49 |
| Do | 9.4 parts of copper (I)chloride | do | 48 |
| Do | 12.5 parts of anhydrous copper (II) chloride | do | 46 |
| Do | 17 parts of anhydrous copper acetate | do | 45 |
| 55 parts of phthalic acid | 11 parts of basic copper sulphate | do | 49 |
| 50 parts of phthalimide | do | do | 47 |
| 65 parts of phthalic acid dimethyl ester | do | do | 48 |
| 50 parts of phthalic anhydride | do | 4 parts of 2,5-diimino-3,4-diphenyl-Δ3-pyrroline | 48 |
| Do | do | 4 parts of 2,5-diimino-3,4-diphenyl-pyrrolidine | 47 |

EXAMPLE 13

A mixture of 25 parts of phthalic anhydride, 31 parts of a 4-chloro-phthalic anhydride and 100 parts by volume of nitrobenzene is heated to 90–100° C. 78 parts of urea, 6 parts of ammonium chloride, 11 parts of basic copper sulphate, 0.1 part of ammonium molybdate and 6 parts of α,α'-diphenyl-maleic anhydride are introduced and the reaction is carried out in accordance with the data of Example 1(A). A greenish-tinged blue crude copper phthalocyanine is obtained in a yield of about 50 parts. From it, solvent-resistant, intensely coloured, greenish-tinged blue copper phthalocyanine pigments in the β-modification or α-modification are produced by a forming process according to the data of Example 1(B).

If, instead of 4-chloro-phthalic anhydride equivalent amounts of 4phenyl-phthalic anhydride or 4-methoxy-phthalic anhydride are used, green-blue copper phthalocyanine pigments which are stable to solvents are obtained on appropriate forming.

The pigments can be used for pigmentation of the substrates indicated in Examples 2–11, in accordance with the procedure indicated in these examples.

EXAMPLE 14

78 parts of urea, 6 parts of ammonium chloride, 11 parts of basic copper sulphate, 0.1 part of ammonium molybdate and 11.5 parts of copper tribenzo-diphenyl-tetraazaporphine (manufactured from 3 mols of 1,3-diimmino-isoindoline, 1 mol of 2,5-diimino-3,4-diphenyl-Δ3-pyrroline and 1 mol of copper acetate in ethylene glycol at 120° C.) are introduced, at 90–100° C., into a mixture of 42 parts of phthalic anhydride and 100 parts by volume of nitrobenzene, and the procedure indicated in Example 1(A) is followed. The resulting crude copper phthalocyanine (yield approx. 48 parts) on forming according to Example 1(B2) yields a solvent-resistant copper phthalocyanine pigment in the α-modification.

The pigment thus obtained can be used for pigmenting the substrates indicated in Examples 2–11, in the manner indicated in these examples.

EXAMPLE 15

78 parts of urea, 100 parts of ammonium chloride and 0.5 part of ammonium molybdate are introduced into a mixture of 50 parts of phthalic anhydride and 100 parts by volume of nitrobenzene at 90–100° C., and the whole is heated to 155° C. for 1 hour whilst stirring. This temperature is maintained for 1 hour. A mixture of 12.8 parts of anhydrous nickel chloride and 4 parts of α,α'- diphenyl-succinic acid dinitrile is then introduced slowly (approximately over the course of 10 minutes) and the mixture is stirred for a further 3 hours at 155° C. The temperature is now raised to 195–198° C. and the reaction is completed in about 3 hours at this temperature. After working up in accordance with the data of Example 1(A), about 41–42 parts of crude nickel phthalocyanine are obtained, which can be formed in accordance with the methods described in Example 1(B) to give intensely coloured, solvent-resistant, green-glue nickel phthalocyanine pigments in the β-modification or α-modification.

Nickel phthalocyanine pigments of similar properties are obtained if instead of nickel chloride equivalent quantities of dry basic nickel sulphate or anhydrous nickel acetate are used and instead of α,α'-diphenyl-succinic acid dinitrile the compounds of the Formulae II–IV indicated in the preceding table are used.

The pigments can be employed for pigmenting the substrates indicated in Examples 2–11 in the manner indicated in these examples.

EXAMPLE 16

A mixture of 18.8 parts of copper(I) chloride, 10 parts of pyridine and 100 parts by volume of nitrobenzene is heated to 100° C. for ½ hour. 60 parts of phthalodinitrile, 4 parts of α,α'-diphenyl-succinic acid dinitrile and a further 100 parts by volume of nitrobenzene are then introduced, and the temperature is rapidly raised to 200° C., whilst stirring well. The reaction mixture is stirred for about 6 hours at 200–205° C., thereafter cooled to approx. 80° C. and diluted with methanol, and the product is filtered off and washed with methanol. The filter cake is stirred for 1 hour in 1000 parts of 5% strength sulphuric acid at 80–90° C., filtered off, washed until free of acid and dried. A coarsely crystalline crude copper phthalocyanine is obtained in an amount of approx. 64 parts, corresponding to a yield of 91% of theory.

Instead of nitrobenzene, trichlorobenzene, kerosene or glycol can equally successfully be used as solvent.

In a different type of working up, the reaction mixture is evaporated to dryness in vacuo in a siutable rotary vessel at 90–120° C. and the residue is subsequently digested with warm dilute sulphuric acid. Here, again, approx. 64 parts of crude copper phthalocyanine are obtained.

Forming thereof in accordance with the data of Example 1(B) yields an intensely coloured, greenish-tinged blue copper phthalocyanine pigment in the β-modification or a very intensely coloured, reddish-tinged blue copper phthalocyanine pigment in the α-modification (specific surface area: approx. 68 m.²/g.).

(Test of stability to solvents: 3 parts of the reddish-tinged blue copper phthalocyanine pigment in the α-modification, thus obtained, in 100 parts of toluene, are heated for 1 hour under reflux, filtered off, washed with a little toluene and dried in vacuo at 60° C. The sample shows no crystallisation and no change in colour shade; it remains as the pure α-modification.)

The pigments can be used for pigmenting the substrates indicated in Examples 2-11, in the manner indicated in these examples.

EXAMPLE 17

6 parts of the crude copper phthalocyanine obtained according to Example 16, and 3 parts of barium sulphate are introduced into 40 parts of concentrated sulphuric acid and the mixture is stirred for 2 hours at 20-25° C. The solution is then allowed to run into 1000 parts of water, 0.5 part of the emulsifier used in Example 1(B2) is added, and the whole is heated to 80-90° C. for 1 hour. After filtering off and drying in vacuo at 60° C., a reddish-tinged blue copper phthalocyanine pigment which is stable to solvents is obtained, and this can be used for pigmenting the substrates indicated in Examples 2-11 in the manner indicated in these examples.

EXAMPLE 18

If instead of the copper(I) chloride in Example 16, 25.6 parts of anhydrous copper(II) chloride are used and in other respects the same procedure is followed, a crude copper phthalocyanine is formed, which contains about 3.8% of chlorine. On appropriate forming, copper phthalocyanine pigments are produced which are very clear and somewhat greener than those obtained according to Example 16.

EXAMPLE 19

15.5 parts of copper(I) chloride are introduced into 200 parts by volume of nitrobenzene and dry ammonia is introduced until the mixture is saturated. 60 parts of phthalodinitrile and 4 parts of $\alpha,\alpha'$-diphenyl-succinic acid dinitrile are then added, the mixture is rapidly heated to 140° C. with good stirring, and this temperature is maintained for approx. ¼ hour and thereafter rapidly raised to 200° C. The mixture is stirred for about 4 hours at 200-205° C. and worked up in accordance with the data of Example 16. The yield is about 64-65 parts of crude copper phthalocyanine. When this is subjected to a forming process in accordance with the data of Example I(B), it yields very clear, intensely coloured, copper phthalocyanine pigments which are stable to solvents and which can be used for pigmenting the substrates indicated in Examples 2-11 in the manner indicated in these examples.

If instead of 15.5 parts of copper(I) chloride, 14.4 parts or 13.2 parts or 12.0 parts of copper(I) chloride are used, the yields of crude copper phthalocyanine are about 63 or 61 or 60 parts respectively.

If the copper(I) chloride is replaced by 18 parts of anhydrous copper(II) chloride and in other respects the same procedure is followed, a partially chlorinated crude copper phthalocyanine (chlorine content about 3.0%) is produced, which on forming yields the somewhat greener copper phthalocyanine pigments of Example 18.

EXAMPLE 20

12 parts of phthalodinitrile and 0.8 parts of $\alpha,\alpha'$-diphenyl-succinic acid dinitrile are intimately mixed with 2.9 parts of dry copper(I) chloride and 48 parts of anhydrous sodium sulphate and warmed to a temperature of 200° C. in a suitable drying oven. The comminuted sintered material (approx. 60 parts) is stirred with 100 parts of 5% strength sulphuric acid for 1 hour at 90° C., filtered off and washed with hot water. After drying, about 12.6 parts of crude copper phthalocyanine are obtained, which can be formed according to Example 1(B2) to give an intensely coloured copper phthalocyanine pigment in the $\alpha$-modification, which is stable to solvents.

The forming can also be carried out by grinding the sintered material in a 1 l. ball mill, with 1 part of n-butanol, for 50 hours, subsequently filling the mill with hot water, adding 1 part of the emulsifier used in Example 1(B2), running the mill for 1 hour, filtering off the suspension and washing the residue with hot water. After drying at 60° C. in vacuo, a copper phthalocyanine pigment which is stable to solvents and consists to the extent of almost 100% of the $\alpha$-modification is obtained.

The pigment can be used for pigmenting the substrates indicated in Examples 2-11.

EXAMPLE 21

A mixture of 18.8 parts of copper(I) chloride, 10 parts of pyridine and 100 parts by volume of nitrobenzene is heated to 100° C. for ½ hour. 30 parts of phthalodinitrile, 48 parts of 3,4-dicyanodiphenyl, 4 parts of $\alpha,\alpha'$-diphenyl-succinic acid dinitrile and a further 100 parts by volume of nitrobenzene are then introduced, and the temperature is rapidly raised to 200° C. whilst stirring well. The reaction is completed at this temperature in accordance with the data of Example 16. A greenish-blue crude copper phthalocyanine is obtained, the forming of which in accordance with the data of Example 1(B) yields intensely coloured green-blue copper phthalocyanine pigments, in the $\beta$-modification or $\alpha$-modification, which are stable to solvents.

If instead of 3,4-dicyanodiphenyl equivalent quantities of 4-methoxy-phthalodinitrile or 4-chloro-phthalodinitrile are used, green-blue copper phthalocyanine pigments which are stable to solvents are obtained on appropriate forming. If the 3,4-dicyanodiphenyl is replaced by an equivalent quantity of 2,3-dicyanopyridine, a red-blue copper phthalocyanine pigment is produced.

The pigments thus obtained can be used for pigmenting the substrates indicated in Examples 2-11 in accordance with the procedure indicated in these examples.

EXAMPLE 22

53.5 parts of phthalodinitrile, 11.5 parts of copper tribenzo-diphenyl-tetraazaporphine and a further 100 parts by volume of nitrobenzene are introduced into a mixture of 17 parts of copper(I) chloride, 10 parts of pyridine and 100 parts by volume of nitrobenzene, previously heated to 100° C., and the procedure indicated in Example 16 is followed. The resulting crude copper phthalocyanine on forming according to Example 1(B) yields copper phthalocyanine pigments in the $\beta$-modification or $\alpha$-modification which are stable to solvents.

If instead of the copper tribenzo-diphenyl-tetraazaporphine the corresponding nickel complex is used, a pigment of similar properties is produced, which can be used for pigmenting the substrates indicated in Examples 2-11.

Intensely coloured copper phthalocyanine and nickel phthalocyanine pigments which are stable to solvents are obtained if the process of Example 16 is carried out with the metal salts and the compounds of the Formulae II-IV indicated in the table which follows.

| Metal salt | Compound of the Formulae II-IV | Yield, SL parts |
|---|---|---|
| 17.9 parts of copper(I) chloride | 4 parts of $\alpha,\alpha'$-diphenylsuccinic acid dinitrile | 63 |
| 16.7 parts of copper(I) chloride | do | 64 |
| 15.5 parts of copper(I) chloride | do | 63 |
| 14.4 parts of copper(I) chloride | do | 59 |
| 13.2 parts of copper(I) chloride | do | 59 |
| 12 parts of copper(I) chloride | do | 56 |
| 24.3 parts of anhydrous copper(II) chloride | do | 61 |
| 22.7 parts of anhydrous copper(II) chloride | do | 62 |
| 21.1 parts of anhydrous copper(II) chloride | do | 55 |
| 19.5 parts of anhydrous copper(II) chloride | do | 60 |
| 17.9 parts of anhydrous copper(II) chloride | do | 58 |
| 28 parts of anhydrous copper acetate | do | 62 |
| 23 parts of basic copper sulphate | 6 parts of $\alpha,\alpha'$-diphenylsuccinic acid dinitrile | 54 |

TABLE—Continued

| Metal salt | Compound of the Formulae II-IV | Yield, SL parts |
|---|---|---|
| 25.6 parts of anhydrous copper(II) chloride | 4 parts of α,α'-diphenylsuccinic acid dinitrile | 59 |
| Do | 2 parts of α,α'-diphenylsuccinic acid dinitrile | 62 |
| 18 parts of anhydrous copper(II) chloride | 4 parts of α,α'-diphenylsuccinic acid dinitrile | 56 |
| 15.5 parts of copper(I) chloride | 8 parts of α-methyl-α'-isopropyl-maleic acid dinitrile | 61 |
| Do | 8 parts of α-methyl-α'-cyclohexyl-maleic acid dinitrile | 60 |
| Do | 5 parts of phenyl-maleic acid dinitrile | 63 |
| Do | 4 parts of α-methyl-α'-phenyl-maleic acid dinitrile | 60 |
| Do | 6 parts of α-methyl-α'-benzyl-maleic acid dinitrile | 62 |
| Do | 2 parts of α,α'-diphenyl-maleic acid dinitrile | 64 |
| Do | 4 parts of phenyl-fumaric acid dinitrile | 62 |
| Do | 5 parts of α-methyl-α'-phenyl-fumaric acid dinitrile | 60 |
| Do | 6 parts of α-methyl-α'-benzyl-fumaric acid dinitrile | 59 |
| Do | 3 parts of α,α'-diphenyl-fumaric acid dinitrile | 63 |
| Do | 5 parts of α-phenyl-α'-benzyl-fumaric acid dinitrile | 61 |
| Do | 5 parts of α-n-propyl-α'-phenyl-succinic acid dinitrile | 62 |
| Do | 3 parts of α-phenyl-α'-p-chlorophenyl-succinic acid dinitrile | 62 |
| Do | 3 parts of α-phenyl-α'-p-isopropylphenyl-succinic acid dinitrile | 61 |
| Do | 3 parts of α-phenyl-α'-p-methoxyphenyl-succinic acid dinitrile | 61 |
| Do | 4 parts of α-phenyl-α'-(3,4-methylenedioxyphenyl)-succinic acid dinitrile | 63 |
| Do | 3 parts of α,α'-di-p-chlorophenyl-succinic acid dinitrile | 64 |
| Do | 3 parts of α-p-chlorophenyl-α'-p-methoxyphenyl-succinic acid dinitrile | 62 |
| Do | 4 parts of 2,5-diimino-3-methyl-4-phenyl-pyrroline | 63 |
| Do | 2 parts of 2,5-diimino-3,4-diphenyl-pyrroline | 63 |
| Do | 2 parts of 2,5-diimino-3-methyl-4-phenyl-pyrrolidine | 61 |
| Do | 4 parts of 2,5-diimino-3-methyl-4-benzyl-pyrrolidine | 60 |
| Do | 2 parts of 2,5-diimino-3,4-diphenyl-pyrrolidine | 63 |
| 23 parts of anhydrous nickel chloride | 2 parts of α,α'-diphenyl-maleic acid dinitrile | 53 |
| Do | 3 parts of α,α'-diphenyl-succinic acid dinitrile | 50 |
| 28 parts of anhydrous nickel acetate | do | 52 |
| 15.5 parts of copper(I) chloride | 10 parts of 2-imino-5-ethoxy-3,4-dimethylpyrrolenine | 61 |

EXAMPLE 23

20 parts of 87% strength 1,3-diimino-isoindoline (technical product, which essentially contains monoiminophthalimide and phthalimide as by-products), 6 parts of copper acetate (as the dihydrate) and 1 part of α,α'-diphenylmaleic acid dinitrile are introduced into 100 parts by volume of ethylene glycol. The mixture is stirred for 1 hour at 60° C. and is then raised to 120° C. over the course of about ½ hour and maintained at this temperature for 2 hours, in the course of which the copper phthalocyanine pigment forms, with evolution of ammonia. The pigment is isolated by diluting the reaction mixture at about 80° C. with methanol, filtering off and washing the product with methanol and hot water. To achieve a powder of soft particles, the filter cake, in 100 parts of water, is stirred with 0.4 part of the emulsifier used in Example 1(B2) for 1 hour at 80–90° C., and the product is filtered off hot and dried at 60° C. in vacuo. About 15.1 parts, corresponding to 87% of theory, of an intensely coloured, clear copper phthalocyanine pigment is obtained, which is stable to solvents and has a specific surface area of approx. 81 m.²/g. Its X-ray diffraction spectrum corresponds to the γ-modification and contains strong lines corresponding to the crystal plane spacings of 13.00 A. and 12.09 A. and lines of medium strength corresponding to the crystal plane spacings of 5.60 A., 3.57 A. and 3.43 A.

The pigment thus obtained can be used for pigmenting the substrates indicated in Examples 2–11, in the manner described therein.

Intensely coloured and solvent-resistant copper phthalocyanine dyestuffs in the γ-modification are also obtained if the process of this example is carried out with the solvents, the copper salts and the compounds of Formulae II–IV indicated in the table which follows.

| Solvent | Copper salt | Compounds of the Formulae II-IV | Yield, parts |
|---|---|---|---|
| Ethylene glycol | 6 parts of copper acetate | 1.5 parts of phenyl-maleic acid dinitrile | 15 |
| Do | do | 1 part of α-methyl-α'-phenyl-maleic acid dinitrile | 14.9 |
| Do | do | 2 parts of α-methyl-α'-benzyl-maleic acid dinitrile | 14.8 |
| Do | do | 2 parts of α-phenyl-α'-benzyl-maleic acid dinitrile | 14.9 |
| Glycerol | do | 1 part of α-phenol-α'-cyclohexyl-maleic acid dinitrile | 14.9 |
| Do | do | 2.5 parts of α-methyl-α'-ethyl-maleic acid dinitrile | 14.3 |
| Do | do | 3 parts of α-methyl-α'-cyclohexyl-maleic acid dinitrile | 14.9 |
| Ethylene glycol | do | 3 parts of α,α'-dimethyl-maleic acid dinitrile plus -fumaric acid dinitrile | 14.2 |
| Diethylene glycol | do | 2 parts of phenyl-fumaric acid dinitrile | 14.8 |
| Ethylene glycol | do | 1.5 parts of α-methyl-α'-phenyl-fumaric acid dinitrile | 14.5 |
| Do | do | 2 parts of α-methyl-α'-benzyl-fumaric acid dinitrile | 14.7 |
| Do | do | 1 part of α,α'-diphenyl-fumaric acid dinitrile | 15.1 |
| Do | do | 1 part of α-phenyl-α'-benzyl-fumaric acid dinitrile | 14.8 |
| Do | do | 1 part of α-n-propyl-α'-phenyl-succinic acid dinitrile | 14.7 |
| Do | do | 0.5 part of α,α'-diphenyl-succinic acid dinitrile | 14.6 |
| Do | do | 1 part of α,α'-diphenyl-succinic acid dinitrile | 15 |
| Do | 4.6 parts of copper oxalate | 2 parts of α,α'-diphenyl-succinic acid dinitrile | 15.2 |
| Do | 6 parts of copper acetate | 1 part of α-phenyl-α'-p-chlorophenyl-succinic acid dinitrile | 15.1 |
| Do | do | 1 part of α-phenyl-α'-p-methoxyphenyl-succinic acid dinitrile | 15.1 |
| Do | do | 1 part of α-phenyl-α'-(3,4-methylene-dioxyphenyl)-succinic acid dinitrile | 14.9 |
| Do | 7.4 parts of copper phthalate | 1 part of α,α'-di-p-chlorophenyl-succinic acid dinitrile | 15.3 |
| Propylene glycol | 6 parts of copper acetate | 1 part of α-p-chlorophenyl-α'-p-methoxy phenyl-succinic acid dinitrile | 15.1 |
| Trimethylene glycol | do | 3 parts of 2,5-diimino-3,4-dimethyl-pyrroline | 14.6 |
| Do | do | 3 parts of 2,5-diimino-3-methyl-4-ethyl-pyrroline | 14.6 |
| Do | do | 2 parts of 2,5-diimino-3-methyl-4-cyclohexyl-pyrroline | 14.7 |
| Propylene glycol | do | 1 part of 2,5-diimino-3-methyl-4-phenyl-pyrroline | 15 |
| Ethylene glycol | do | 2 parts of 2,5-diimino-3-methyl-4-benzyl-pyrroline | 15 |
| Do | do | 1 part of 2,5-diimino-3,4-diphenyl-pyrroline | 15.2 |
| Do | do | 2 parts of 2,5-diimino-3-cyclohexyl-pyrroline | 14.6 |
| Do | do | 3 parts of 2,5-diimino-3,4-dimethyl-pyrrolidine | 14.3 |
| Do | 8.3 parts of copper sarcosinate | 3 parts of 2,5-diimino-3-cyclohexyl-4-pyrrolidine | 14.4 |
| Do | do | 1 part of 2,5-diimino-3-methyl-4-phenyl-pyrrolidine | 14.7 |
| Do | do | 2 parts of 2,5-diimino-3-methyl-4-benzyl-pyrrolidine | 14.6 |
| Do | do | 1 part of 2,5-diimino-3,4-diphenyl-pyrrolidine | 14.9 |

EXAMPLE 24

200 parts of 87% strength 1,3-diimino-isoindoline (89 mol percent), 35 parts of α,α'-diphenylsuccinic acid dinitrile (11 mol percent) and 66 parts of copper acetate are introduced into 1000 parts by volume of ethylene glycol and the mixture is stirred for 1 hour at 60° C. and 2 hours at 120° C. After working up in accordance with Example 23, about 155 parts of a solvent-resistant, somewhat greenish-tinged blue copper phthalocyanine are obtained.

Its X-ray diffraction spectrum corresponds to the γ-modification and contains strong lines corresponding to the crystal plane spacings of 12.94 A. and 12.09 A. and lines of medium strength corresponding to the crystal plane spacings of 5.61 A., 3.57 A. and 3.44 A.

To determine the proportion of pure copper phthalocyanine, 50 parts of this pigment are dissolved in 325 parts by volume of 100% strength sulphuric acid and 94 parts of water are added dropwise to this solution, with external cooling. The copper phthalocyanine which has crystallised out is filtered off, on a glass frit, from the 86% strength sulphuric acid thus obtained, and is washed with 85% strength sulphuric acid. The filter cake is suspended in 1000 parts of hot water, filtered off, washed until neutral and dried at 100° C. About 41.5 parts of pure copper phthalocyanine are obtained. If the approx. 85% strength to 86% strength sulphuric acid of the filtrate is reduced to a concentration of about 60% by dropwise addition of water, and the mixture is filtered, it is possible to isolate about 7 parts of a green-blue product which substantially consists of copper tribenzo-diphenyl-tetraazaporphine and still contains traces of copper phathalocyanine. The copper phthalocyanine pigment produced above accordingly contains approx. 83% of copper phthalocyanine and approx. 14% of copper tribenzo-diphenyl-tetraazaporphine, corresponding to 85 mol percent of copper phthalocyanine and 12 mol percent of copper tribenzo-diphenyl-tetraazaporphine. It can be used to pigment the substrates indicated in Examples 2–11, in the manner described therein.

EXAMPLE 25

100 parts of technical phthalodinitrile are introduced into 550 parts by volume of ethylene glycol, and 25 parts of ammonia are introduced whilst stirring and cooling with water. 10 parts of fresh sodium methylate are then added and the mixture is stirred for 1 hour at 50–55° C., in the course of which 1,3-diimino-isoindoline is formed. When a sample gives a clear solution in water (after approx. 1 hour), 37.5 parts of copper acetate and 5 parts of α,α'-diphenylsuccinic acid dinitrile are added, the mixture is heated from 60° C. to 120° C. over the course of 1 hour, and the latter temperature is maintained for 2 hours. Working up is carried out in accordance with the data of Example 23. About 100 parts of an intensely coloured, clear, solvent-resistant copper phthalocyanine pigment in the γ-modification are obtained, and this can be used for pigmenting the substrates indicated in Examples 2–11, in the manner described therein.

EXAMPLE 26

20 parts of 87% strength 1,3-di-imino-isoindoline (technical product, which essentially contains monoiminophthalimide and phthalimide as by-products), 7.5 parts of nickel acetate (as tetrahydrate) and 1 part of α,α'-diphenyl-succinic acid dinitrile are introduced into 100 parts by volume of ethylene glycol. The mixture is stirred for 1 hour at 60° C., the temperature is then raised to 120° C. over the course of about ½ hour and maintained thereat for 1 hour, and the mixture is then further stirred for 4–5 hours at 140–150° C. Working up takes place in accordance with the data of Example 23. About 14 parts, corresponding to 82% of theory, of a green-blue nickel phthalocyanine pigment which is stable to solvents and has a specific surface area of approx. 85 m.²/g. are obtained.

The X-ray diffraction spectrum of the product corresponds to the γ-form and contains strong lines corresponding to the crystal plane spacings of 13.06 A. and 11.87 A. and lines of medium strength corresponding to the crystal plane spacings of 5.57 A., 3.58 A. and 3.39 A.

If, instead of α,α'-diphenylsuccinic acid dinitrile, the compounds of the Formulae II–IV indicated in the table below are used, green-blue nickel phthalocyanine pigments in the γ-modification, which are stable to solvents, are again obtained.

| Compound of the Formulae II–IV: | Yield, parts |
|---|---|
| 2 parts of phenyl-maleic acid dinitrile | 14 |
| 1 part of α-methyl-α'-phenyl-maleic acid dinitrile | 14 |
| 1 part of α,α'-diphenyl-maleic acid dinitrile | 14.2 |
| 2 parts of α-methyl-α'-benzyl-fumaric acid dinitrile | 13.8 |
| 1 part of α-n-propyl-α'-phenyl-succinic acid dinitrile | 13.9 |
| 1 part of 2,5-diimino-3-methyl-4-phenyl-Δ3-pyrroline | 14.3 |
| 2 parts of 2,5-diimino-3-methyl-4-benzyl-Δ3-pyrroline | 14 |
| 1 part of 2,5-diimino-3,4-diphenyl-Δ3-pyrroline | 14.5 |
| 1 part of 2,5-diimino-3-methyl-4-phenyl-pyrrolidine | 14 |
| 1 part of 2,5-diimino-3,4-diphenyl-pyrrolidine | 14.2 |

The pigments thus obtained can be used for pigmenting the substrates indicated in Examples 2–11 in the manner described therein.

EXAMPLE 27

100 parts by volume of ethylene glycol, 6 parts of copper acetate, 1 part of α,α'-diphenyl-succinic acid dinitrile and the 1,3-diimino-isoindolines indicated in the table below are heated for 1 hour to 60° C. and 2 hours to 120° C. whilst stirring, and the reaction mixture is worked up in accordance with Example 23. Copper phthalocyanine pigments in the γ-modification, which are stable to solvents, are obtained in the following yields and colour shades.

| 1,3-diimino-isoindolines | Yield, parts | Colour shade |
|---|---|---|
| 16 parts of 1,3-diimino-isoindoline, 87% strength, plus 5.3 parts of 1,3-diimino-5-phenyl-isoindoline. | 15.3 | Greenish-tinged blue. |
| 16 parts of 1,3-diimino-isoindoline, 87% strength, plus 4.2 parts of 1,3-diimino-5-methoxyisoindoline. | 14.5 | Green-blue. |
| 16 parts of 1,3-diimino-isoindoline, 87% strength, plus 3.5 parts of 1,3-diimino-4-aza-isoindoline. | 15.0 | Red-blue. |

EXAMPLE 28

The filter cake obtained according to Example 1(B1) is stirred with 300 parts of water and a solution of 1 part of the hydrochloride of tetra-(hexamethyleneaminomethylene)-copper phthalocyanine in 150 parts of water is run in slowly. The mixture is warmed to 90° C., stirred for 1 hour at this temperature and then adjusted to a pH value of 8–9 with dilute sodium hydroxide solution. The product is filtered off, washed with water and dried at 60° C. in vacuo. About 11 parts of an intensely coloured copper phthalocyanine pigment in the β-modification, which is stable to solvents and flocculation-resistant, are obtained.

If the filter cake of Example 1(B1) is replaced by an equal quantity of the filter cake of Example 1(B2) or of Example 23 (in each case 10 parts of 100% strength material), intensely coloured copper phthalocyanine pigments in the α-modification or γ-modification, which are stable to solvents and flocculation-resistant, are obtained.

Pigments with similar properties are produced if the filter cakes obtained according to Examples 1(B1), 1(B2) or 23 (10 parts of 100% strength material) are suspended in 200 parts of water, the suspension is adjusted to a pH value of 8.5 with concentrated ammonia solution and warmed to 80–85° C., a solution of 2 parts of abietic acid and 1 part of sodium hydroxide in 40 parts of water is run in, after ½ hour at 80–85° C. a solution of 1.5 parts of barium chloride in 15 parts of water is added, and the product is filtered off, washed with hot water and dried in vacuo at 60° C.

Flocculation-resistant copper phthalocyanine pigments can also be obtained by heating the filter cakes obtained according to Examples 1(B1), 1(B2) or 23 (10 parts cf also be obtained by heating the filter cakes obtained according to Examples 1(B1), 1(B2) or 23 (10 parts of 100% strength material) with 1 part (100% strength) of a copper phthalocyanine-monosulphonic acid filter cake in 200 parts of water for 1 hour to 50° C., then adjusting the mixture to a pH value of 1.5 with hydrochloric acid and stirring the suspension for 1 hour at 70° C. The product is filtered off, washed with water and dried at 60° C. in vacuo.

Flocculation-resistant copper phthalocyanine pigments can also be obtained by stirring 10 parts of crude copper phthalocyanine, which are obtained according to Examples 1(A), 16 or 23, with 80 parts by volume of 5% strength oleum for 20 hours at 30–40° C. and subsequently working up as indicated in Example 1(B2).

A copper phthalocyanine pigment which is resistant to crystallization under the influence of organic solvents and to flocculation can also be obtained as follows: A mixture of 50 parts of phthalic anhydride, 4 parts of 4-sulphophthalic acid, 78 parts of urea, 10 parts of ammonium chloride, 11.3 parts of basic copper sulfate and 0.1 part of ammonium molybdate are heated to 160–170° C. carefully whilst stirring and this temperature is maintained for 1 hour. Then 4 parts of α,α'-diphenyl-succinic acid dinitrile are introduced, stirring is continued for two more hours at 170° C., the temperature is raised to 200° C. and this temperature is maintained for 2 hours. After working up as is described in Example 1(A), there are obtained about 50 parts of crude copper phthalocyanine, which can be formed as indicated in Example 1(B).

The pigments can be used for pigmenting the substrates indicated in Examples 2–11 in the manner described therein.

EXAMPLE 29

A mixture of 8 parts of copper phthalocyanine and 2 parts of copper di-phenyl-tribenzo-tetraazaporphine is introduced into 60 parts by volume of concentrated sulphuric acid and the solution is stirred for 4 hours at 20–25° C. Thereafter it is poured out into 1500 parts of water, the suspension is heated for 1 hour at 80–90° C. in the presence of 0.5 part of the emulsifier used in Example 1(B2), and the product is filtered off hot, washed with hot water until neutral and dried at 60° C. in vacuo. A reddish-tinged blue, intensely coloured copper phthalocyanine pigment in the α-modification, which is stable to solvents, is obtained.

Intensely coloured copper phthalocyanine pigments which are stable to solvents are also obtained if instead of copper diphenyl-tribenzotetraazaporphine the same number of parts of the following compounds are used: copper methyl-phenyl-tribenzo-tetraazaporphine, copper phenyl-benzyl-tribenzo-tetraazaporphine or nickel diphenyl-tribenzo-tetraazaporphine.

The pigments thus obtained can be used for pigmenting the substrates indicated in Examples 2–11 in accordance with the processes described therein.

What we claim is:

1. Copper phthalocyanine and nickel phthalocyanine pigments containing 60–98 mol percent of a copper or nickel phthalocyanine, which may be substituted by chlorine, bromine, lower alkyl, phenyl, methoxy, ethoxy or sulphonic acid groups, and 40–2 mol percent of one or more tetraazaporphines of the formula

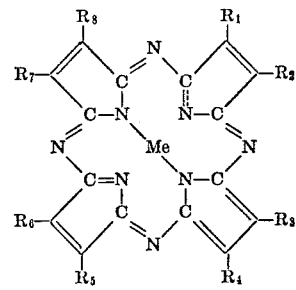

wherein

Me represents copper when a copper phthalocyanine is present or nickel, when a nickel phthalocyanine is present, $R_1$ represents alkyl with 1–4 carbon atoms, cyclohexyl, benzyl or sulphobenzyl, phenyl or phenyl substituted with chloro, methyl, iso-propyl, methoxy, methylenedioxy, $R_2$, $R_3$, $R_4$, $R_5$, $R_6$, $R_7$ and $R_8$ independently of one another represent hydrogen, alkyl with 1–4 carbon atoms, cyclohexyl, benzyl, sulphobenzyl, phenyl or phenyl substituted with chloro, methyl, iso-propyl, methoxy, methylenedioxy, and wherein one or more of the pairs $R_3$ and $R_4$, $R_5$ and $R_6$ or $R_7$ and $R_8$ are cyclised to give a cyclohexene ring or a benzene ring which may be substituted by chlorine, bromine, lower alkyl, phenyl, methoxy, ethoxy or sulphonic acid groups; a pyridine ring or a dithiacyclohexene ring.

2. Copper and nickel phthalocyanine pigments according to claim 1 having a particle size of about $0.5\mu$ to about $10\mu$.

3. Copper and nickel phthalocyanine pigments according to claim 1 having a particle size of about $0.5\mu$ to about $3\mu$.

4. Copper phthalocyanines according to claim 1 which contain 75–96 mol percent of a copper phthalocyanine, which may be substituted by sulphonic acid groups, and 25–4 mol percent of one or more tetraazaporphines of the formula of claim 1.

5. Copper and nickel phthalocyanines of claim 1 characterised in that the copper and nickel phthalocyanines present in the mixture are of the α-modification.

6. Copper and nickel phthalocyanine pigments according to claim 1 which contain at an average 0.1–0.8 sulphonic acid groups per mol of copper and nickel phthalocyanine pigments of the mixture.

7. Copper and nickel phthalocyanine pigments according to claim 4 which contain at an average 0.1–0.6 sulphonic acid groups per mol of phthalocyanine of the mixture.

8. Copper phthalocyanine and nickel phthalocyanine pigments containing 60–98 mol percent of a copper or nickel phthalocyanine and 40–2 mol percent of a tetraazaporphine of the formula

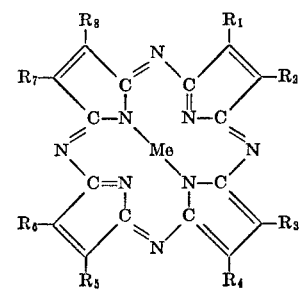

wherein

Me represents copper when a copper phthalocyanine is present or nickel, when a nickel phthalocyanine is present, $R_1$ represents alkyl with 1–4 carbon atoms, cyclohexyl, benzyl or sulphobenzyl, phenyl or phenyl substituted with chloro, methyl, iso-propyl, methoxy, $R_2$, $R_3$, $R_4$, $R_5$, $R_6$, $R_7$ and $R_8$ independently of one another represent hydrogen, alkyl with 1–4 carbon atoms, cyclohexyl, benzyl, sulphobenzyl, phenyl or phenyl substituted with chloro, methyl, iso-propyl, methoxy, and wherein one or more of the pairs $R_3$ and $R_4$, $R_5$ and $R_6$, $R_7$ and $R_8$ are cyclised to give a benzene ring.

References Cited

UNITED STATES PATENTS 2,681,344   6/1954   Fance _____ 260—314.5

FOREIGN PATENTS 763,084   1/1964   Great Britain _____ 260—314

DELBERT E. GANTZ, Primary Examiner
J. V. HOWARD, Assistant Examiner

U.S. Cl. X.R.

260—314.5